(12) United States Patent
Sethi (10) Patent No.: US 12,007,500 B2
(45) Date of Patent: Jun. 11, 2024

(54) METHOD AND SYSTEM FOR SELF-CALIBRATING A SCANNING SYSTEM USING INERTIAL MEASUREMENT SPATIAL AND TEMPORAL DATA

(71) Applicant: TDK Corporation, Tokyo (JP)

(72) Inventor: Rakesh Sethi, Saratoga, CA (US)

(73) Assignee: TDK CORPORATION, Tokyo (JP)

( * ) Notice: Subject to any disclaimer, the term of this patent is extended or adjusted under 35 U.S.C. 154(b) by 451 days.

(21) Appl. No.: 17/353,041

(22) Filed: Jun. 21, 2021

(65) Prior Publication Data

US 2022/0404459 A1   Dec. 22, 2022

(51) Int. Cl.
  *G01S 7/40* (2006.01)
  *B60G 17/019* (2006.01)
  (Continued)

(52) U.S. Cl.
  CPC .............. *G01S 7/40* (2013.01); *B60G 17/019* (2013.01); *G01B 5/24* (2013.01); *G01S 7/4817* (2013.01);
  (Continued)

(58) Field of Classification Search
  CPC ........ G01S 7/40; G01S 17/931; G01S 7/4817; G01S 7/497; G01S 13/865; G01S 13/89; G01S 13/931; G01S 17/89; G01S 13/426; G01S 13/86; G01S 17/42; G01S 7/4026; G01S 7/4972; G01S 2013/9323;
  (Continued)

(56) References Cited

U.S. PATENT DOCUMENTS 11,203,313 B2 *  12/2021  Momii ................ G01S 7/027
2018/0143320 A1 *  5/2018  Steever ................ G01S 17/89
(Continued)

FOREIGN PATENT DOCUMENTS

CN   109143257 A  *  1/2019  ............. G01S 17/88

OTHER PUBLICATIONS

CN_109143257_A_I_translate.pdf—translation of CN109143257A (Year: 2019).*
(Continued)

*Primary Examiner* — Olumide Ajibade Akonai
*Assistant Examiner* — Yonghong Li
(74) *Attorney, Agent, or Firm* — Morgan, Lewis & Bockius LLP (57) ABSTRACT

A self-calibrating scanning system and method provides a novel way to eliminate errors in scanning systems, such as lidar or radar detection, using an inertial measurement unit. The system includes an energy transmission source configured to transmit an energy signal through a transmittal area. A detector receives a return energy signal of at least one target object of the energy transmitter source within the transmittal area. The system calculates at least one of the range and position of an object from information relating to at least one of the time and phase of the return energy signal relative to the transmittal energy signal. The spatial or angular displacement of the detector relative to the light source is measured using data from the inertial measurement unit, and at least one of calculated range and position of the object is adjusted based on the spatial or angular displacement of the detector.

21 Claims, 5 Drawing Sheets

(51) Int. Cl.
  *G01B 5/24* (2006.01)
  *G01S 7/481* (2006.01)
  *G01S 7/497* (2006.01)
  *G01S 13/86* (2006.01)
  *G01S 13/89* (2006.01)
  *G01S 13/931* (2020.01)
  *G01S 17/89* (2020.01)
  *G01S 17/931* (2020.01)

(52) U.S. Cl.
  CPC .............. *G01S 7/497* (2013.01); *G01S 13/865* (2013.01); *G01S 13/89* (2013.01); *G01S 13/931* (2013.01); *G01S 17/89* (2013.01); *G01S 17/931* (2020.01); *B60G 2400/82* (2013.01)

(58) Field of Classification Search
  CPC ........ G01S 2013/93273; B60G 17/019; B60G 2400/82; B60G 17/015; B60G 2400/0514; B60G 2400/25; B60G 2401/14; B60G 2401/174; B60G 2401/28; B60G 2800/702; G01B 5/24
  See application file for complete search history.

(56) References Cited

U.S. PATENT DOCUMENTS

2019/0064364 A1* 2/2019 Boysel ................. G05D 1/0231
2020/0341130 A1* 10/2020 Hayashi ................ G01S 13/282
2021/0255329 A1* 8/2021 Li .......................... G01S 17/931
2022/0398851 A1* 12/2022 Nehmadi .............. G01S 13/865

OTHER PUBLICATIONS

Skolnik90_radar_handbook.pdf (from http://www.geo.uzh.ch/microsite/rsl-documents/research/SARlab/GMTILiterature/PDF/Skolnik90.pdf) (Year: 1990).*
"Introducing the First Digital Automotive Radar-on-Chip," https://www.uhnder.com, retrieved Oct. 21, 2021.
"Radar Revolution. Delivered.," https://www.arberobotics.com, retrieved Oct. 21, 2021.
"Velodyne Lidar," https://www.velodynelidar.com, retrieved Oct. 21, 2021.
"Perception for All Devices," https://www.aeva.ai, retrieved Oct. 21, 2021.

* cited by examiner

METHOD AND SYSTEM FOR SELF-CALIBRATING A SCANNING SYSTEM USING INERTIAL MEASUREMENT SPATIAL AND TEMPORAL DATA

BACKGROUND

Various scanning systems, such as radar or light detection and ranging (lidar) systems are required to automate safe operation of an automotive vehicle or unmanned aerial vehicle (UAV), to avoid collisions, alert a driver to problems during navigation, localization and communications. Many such systems require machine learning and other tools to build 3D maps and classification to quantify the objects and obstacles at all speeds of the moving vehicle.

In particular, lidar is a common sensing method used in automotive vehicles to detect objects, map their distances, and generate 3D and 4D maps. Lidar systems work by illuminating a target with light and measuring the returning light from the target with a sensor. The light may be pulsed or coherent. Based on the returning signal, for example based on differences in laser return times and wavelengths, a representation of the target, such as a three-dimensional digital representation of the target implemented in one or more electronic media, can be made.

These scanning systems and sub-systems generally try to improve range and angular accuracy and small object resolution. Angular accuracy refers to the angle extended by a point P in space relative to the x-axis (e.g. the axis of motion of a vehicle).

SUMMARY

Most of these systems suffer in accuracy and resolution due to adverse weather conditions and generate false positives or negatives. In addition, the movement of the vehicle may also include vibration due to the motion and to uneven road (or environmental) conditions, leading to image stabilization issues.

This invention provides a novel way to self-calibrate a scanning system, such as a lidar or radar system, using an inertial measurement unit. Embodiments consistent with principles of the invention eliminate errors in lidar or radar detection by providing spatial position and phase data from inertial measurement units built into the chassis of an energy transmission source (e.g. a laser source in lidar). The spatial and phase data provided by the inertial measurement units may be used for range and angular correction (e.g. based on beam divergence, scanning angle, mirror de-acceleration) in real time. By using at least one of light, spatial and phase data, sensors consistent with inventive principles described herein provide improvements in sensor range and field of view, while collecting spatial data for pre- or post-processing of 3D or 4D map generation. As examples, the 3D maps may simply identify objects within an (x,y,z) coordinate plane, and a 4D map could include another dimension such as time, or vibration data from a sensor. In this process, embodiments utilize a combination of machine learning (ML) algorithms, statistical approaches, and rigorous mathematical optimization algorithms to eliminate the errors caused by environmental factors or otherwise by movement of the vehicle.

According to an embodiment of the invention, a scanning system, such as lidar or radar detection, includes an energy transmission source configured to transmit an energy signal through a transmittal area. A detector receives a return energy signal of at least one target object of the energy transmitter source within the transmittal area. The system calculates at least one of the range and position of an object from information relating to at least one of the time and phase of the return energy signal (return density as a function of road and environmental conditions) relative to the transmittal energy signal. The spatial or angular displacement of the detector relative to the light source is measured using data from an inertial measurement unit. The system then adjusts at least one of calculated range and position of the object based on the spatial or angular displacement of the detector. A map of the transmittal area, including any objects within the transmittal area, may be generated with greater accuracy. In some embodiments consistent with principles of the invention, the energy transmission source and the inertial measurement unit are mechanically coupled to an area proximate to a wheel of a vehicle, such that they are below the suspension of the chassis.

In some embodiments the scanning system is a lidar system or a radar system. The pulsed light waves used in lidar are a form of electromagnetic radiation at the visible and near-infrared frequencies in the spectrum. One of skill in the art will recognize that the other forms of electromagnetic radiation at different frequencies in the spectrum may be used in connection with embodiments of the invention. The following working examples therefore, specifically point out the preferred embodiments of the present invention, and are not to be construed as limiting in any way the remainder of the disclosure. In other embodiments, the scanning system is a millimeter wave radar system and the energy transmission source is a millimeter wave source.

In some embodiments, the system may include both a lidar detection system and a radar system such that the radar system generates a probabilistic map of the transmittal area using the return radio signal. The probabilistic map be used to adjust at least one of a calculated range and position of an object by synchronizing the probabilistic map with a lidar generated map of the transmittal area.

In other embodiments, the system adjusts at least one of the calculated range and position of the object by synchronizing the spatial or angular displacement of the detector to receipt of a return energy signal.

In some embodiments, the energy transmission source and inertial measurement unit are mounted within a single housing such that spatial or angular displacement of the detector relative to the energy source may be measured. In yet other embodiments, the energy transmission source and inertial measurement are mechanically coupled to a single housing such that spatial or angular displacement of the detector relative to the energy source may be measured.

In alternative embodiments, a scanning system, such as lidar or radar detection, includes an energy transmission source configured to transmit an energy signal through a transmittal area. A detector receives a return energy signal of at least one target object of the energy transmitter source within the transmittal area. The system calculates at least one of the range and position of an object from information relating to at least one of the time and phase of the return energy signal (return density as a function of road and environmental conditions) relative to the transmittal energy signal. The spatial or angular displacement of the detector relative to the light source is measured using data from an inertial measurement unit. An undampened inertial measurement unit is located below a suspension of a chassis of a vehicle such that undampened spatial or angular displacement of the detector relative to the ground may be measured. The system then adjusts at least one of calculated range and position of the object based on the spatial or angular displacement of the detector and displacement of the chassis. A map of the transmittal area, including any objects within the transmittal area, may be generated with greater accuracy.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In accordance with an embodiment of the invention, there is provided a method for calibrating a scanning system, such as a lidar or radar system, using an inertial measurement unit. An energy transmitter source, such as a light source in a lidar system, is configured to transmit an energy signal through a transmittal area. The system includes a detector configured to receive a return energy signal of at least one target object of the energy transmitter source within the transmittal area. The system calculates the range and position of an object from information relating to the time and phase of the return energy signal relative to the transmittal energy signal. The spatial or angular displacement of the detector relative to the light source is measured using data from the inertial measurement unit. An inertial measurement unit is an electronic device that measures and relates an object's specific force, angular rate, and sometimes the orientation of the object, using a combination of accelerometers, gyroscopes, tire/wheel sensors and sometimes magnetometers. Typically, an accelerometer measures the displacement of the object in three dimensions (x,y,z) and the gyroscope provides the angular displacement The system then adjusts the calculated range and position of the object based on the spatial or angular displacement of the detector. This allows the system to account for any movement of vehicle due to adverse weather condition, or road hazards, and to generate a map of the transmittal area, including any objects within the transmittal area, with greater accuracy.

Figure 1:
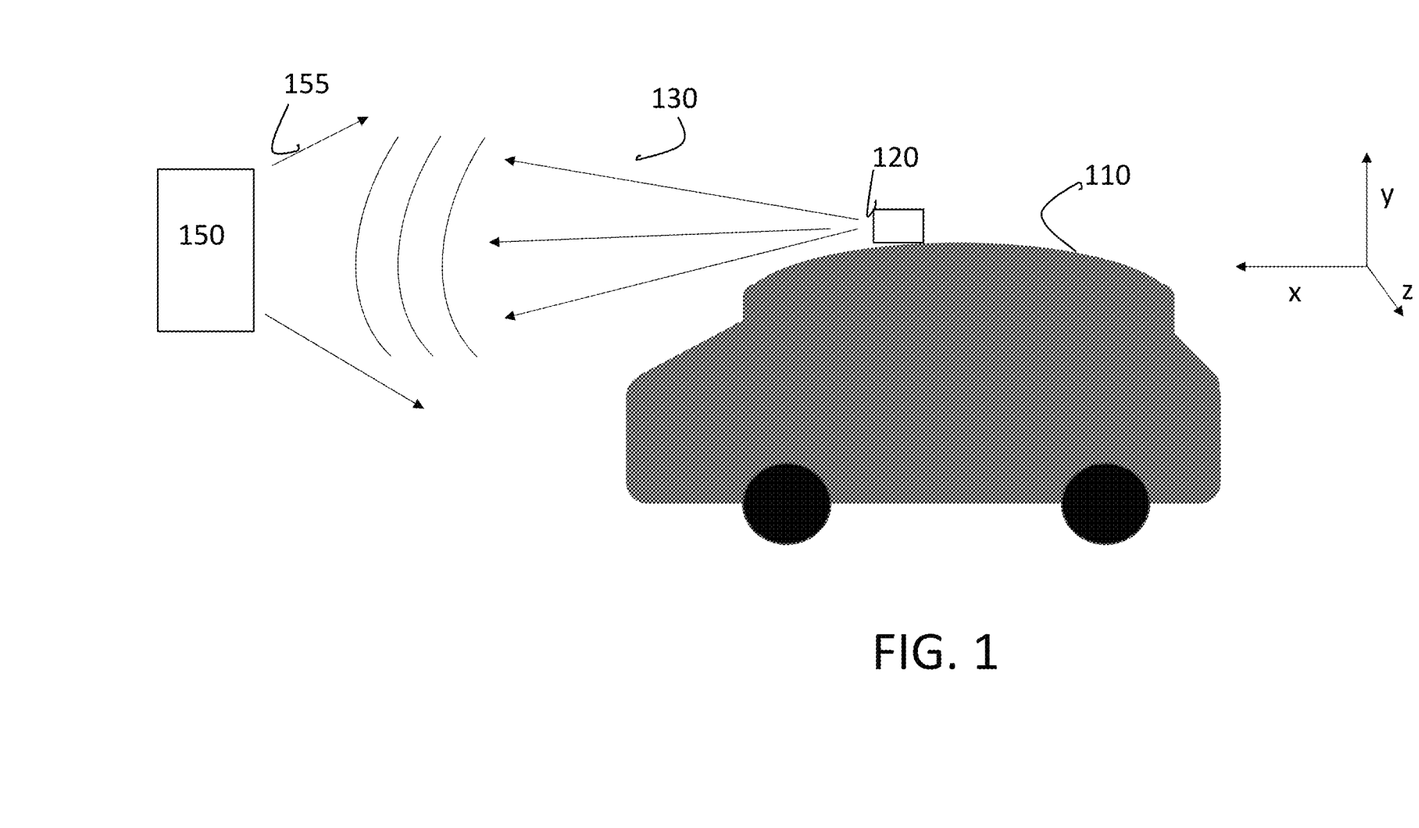
FIG. 1 is a schematic diagram of illustrating a vehicle employing a scanning system in accordance with an embodiment of the invention.

FIG. 1 is a diagram illustrating vehicle 110 employing a scanning system 120 in accordance with an embodiment of the invention. A vehicle 110, such as a car, may contain one or more scanning systems 120. The scanning system 120 may include an energy source (not shown in FIG. 1), such as a light source for a lidar system, or a radio signaling source in a radar system. In yet other embodiments, the scanning system may be a millimeter wave radar system and the energy source may be a millimeter wave.

As the vehicle 110 moves, the scanning system 120 may transmit an energy signal 130 through a transmittal area to detect any objects 150 within the area. The scanning system 120 also includes a detector (not shown in FIG. 1) to receive a return energy signal 155. Using the returning energy signal 155, the approximate range and position of the object 150 may be calculated based on differences in return times and phase data.

As the vehicle 110 travels along one direction (e.g. along the x-axis) and transmits energy signals 130, movements in other directions (e.g. the x-axis, y-axis and z-axis) may displace the position of the scanning system's sensor to affect the expected location or timing of the return signal 155 leading to image stabilization issues. To compensate for any vibration due to the motion and to uneven road conditions, the scanning system 120 may use an inertial measurement unit (not shown in FIG. 1) in proximity to the energy source to measure spatial or angular displacement of the detector relative to the energy source. The calculated range and position of the object may then be adjusted based on the spatial or angular displacement of the detector, and a representation of the target, such as a three-dimensional digital representation of the target implemented in one or more electronic media, can be made. In some embodiments, the inertial measurement unit is co-located with the energy source and sensor in the same chassis to eliminate errors in the range and angular correction in real time. In some embodiments, the inertial measurement unit may capture multiple spatial or angular displacement such as movement along the x-axis, y-axis, or z-axis, as well as yaw, rotation and roll. In some embodiments, the inertial measurement unit may capture multiple road and environmental signals such as tire/wheel and other sensors to detect air, fog, gas etc.

In some embodiments, the energy transmission source and inertial measurement unit may be mounted within a single housing or may be mechanically coupled to the chassis of a single housing, such that vibrations or other spatial or angular displacement of the detector relative to the energy source may be measured.

In some embodiments, the scanning system is a lidar based system and the energy transmission source is a light source. In some embodiments, the lidar based system may be supplemented by including radar based system wherein a radio signal is transmitted from a radio signaling source through the transmittal area and a return radio signal of the at least one target object of the radio signaling source is received at a radio signal detector. The system may then use the radio signaling information to generate a probabilistic map of the transmittal area. By synchronizing the probabilistic map with the lidar based map of the transmittal area, the range and position of the object may be further refined. In yet other embodiments, the scanning system may be a radar based system and the energy source is a radio signaling source.

Figure 2:
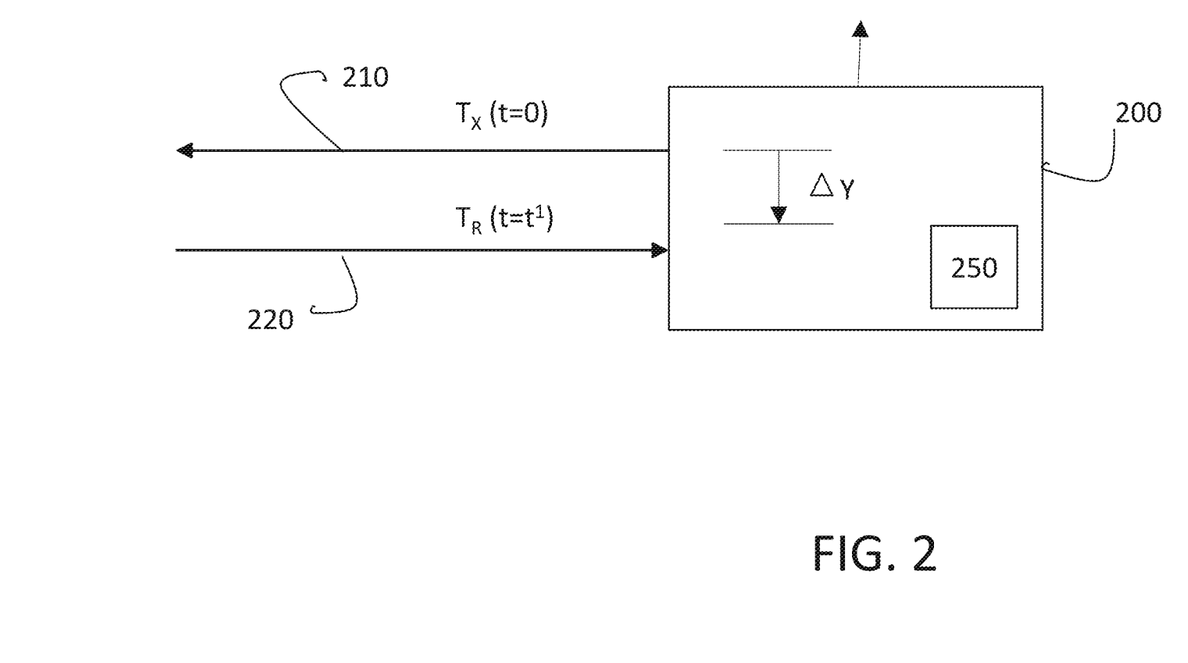
FIG. 2 is a schematic diagram of a sensor in which embodiments consistent with the invention may be used.

FIG. 2 is a schematic diagram of a sensor in which embodiments consistent with the invention may be used. The scanning system 200 includes an energy transmission source that transmits an energy signal 210 at an initial reference time (t=0). The return signal 220 may be received at the scanning system 200 at some time (t=$t^1$) later. During the time that elapses between the transmission and reception, there may be some displacement (e.g. $\Delta$ y) of the scanning system due to any number of factors. An inertial measurement unit 250 may detect such displacement during the time the transmission and reception. The system may then adjust the calculated range and position of a target object based on the spatial or angular displacement of the detector.

Figure 3:
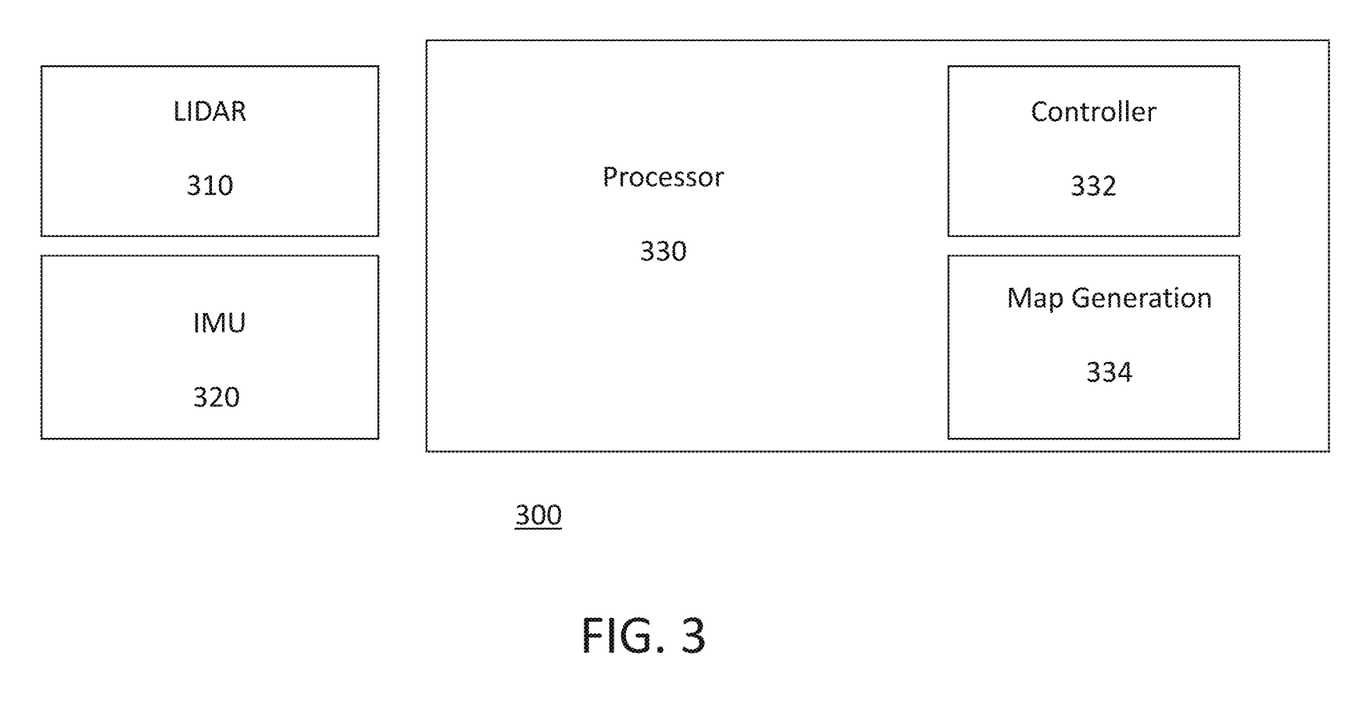
FIG. 3 is a schematic block diagram of one embodiment of a self-calibrating scanning system consistent with principles of the invention.

As illustrated in FIG. 3, an exemplary scanning system 300 may include a lidar sensor 310 and an inertial measurement unit 320 coupled to a processor 330. The processor may include a map generation module 334 that may be used to generate a map of the transmittal area scanned by the scanning system, and any one target objects located within the transmittal area. In some embodiments, the processor may also include a controller 332 that may be used in connection with the operation of the vehicle in which the scanning system 300 is used. In other embodiments, the controller 332 may be located in a separate processing unit than processor 330 and in electrical communication with the processor 330. In embodiments consistent with principle of the invention, the processor 330 may be configured to calculate the range or position of a target object from information relating to the time and phase of a return energy signal relative to a transmittal energy signal. The processor may then measure spatial or angular displacement of the detector relative to the energy source with an inertial measurement unit, and adjust at least one of the calculated range and position of the at least one target object based on the spatial or angular displacement of the detector. The processor can then generate a map of the transmittal area, the map including a location corresponding to the at least one target object based on the at least one of adjusted range and position. In some embodiments, the controller within the processor may transmit signals to an actuator to control the positioning of the energy source based on the spatial or angular displacement of the detector.

Figure 4:
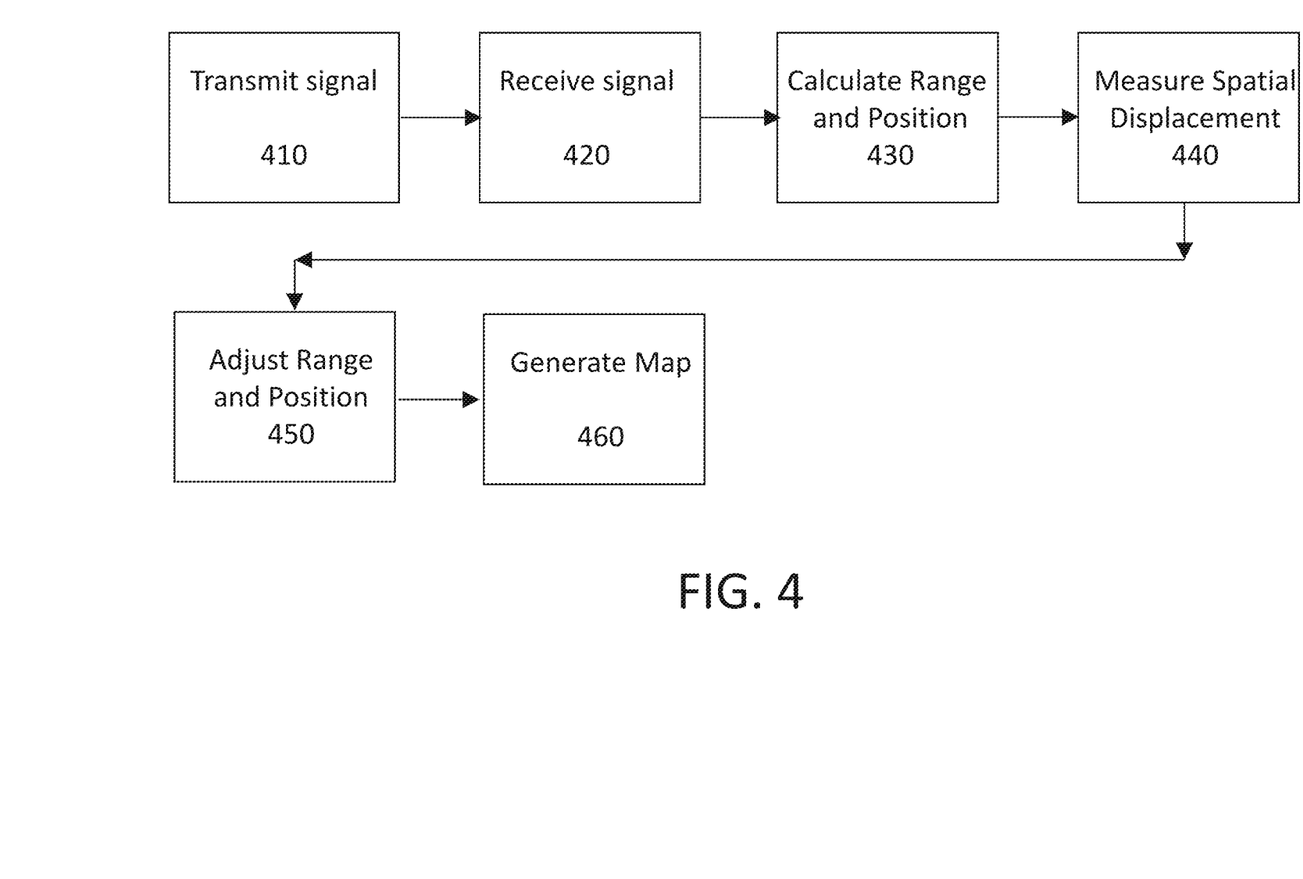
FIG. 4 is a flow diagram illustrating a method of calibrating a scanning system consistent with principles of the invention.

FIG. 4 is a flow diagram illustrating a method of calibrating a scanning system consistent with principles of the invention. At step 410 the scanning system transmits a transmittal energy signal from an energy transmission source through a transmittal area. At step 420, the scanning system receives a return energy signal of at least one target object of the energy transmitter source within the transmittal area at a detector. At step 430 the scanning system calculates the range and position of a target object from information relating to the time and wavelengths of the return energy signal relative to the transmittal energy signal. At step 440, an inertial measurement unit measures the spatial or angular displacement of the detector relative to the energy transmission source. At step 450, the scanning system adjusts the calculated range and position of the object based on the spatial or angular displacement of the detector. At step 460, the scanning system generates a map of the transmittal area, including at least one target object.

Figure 5:
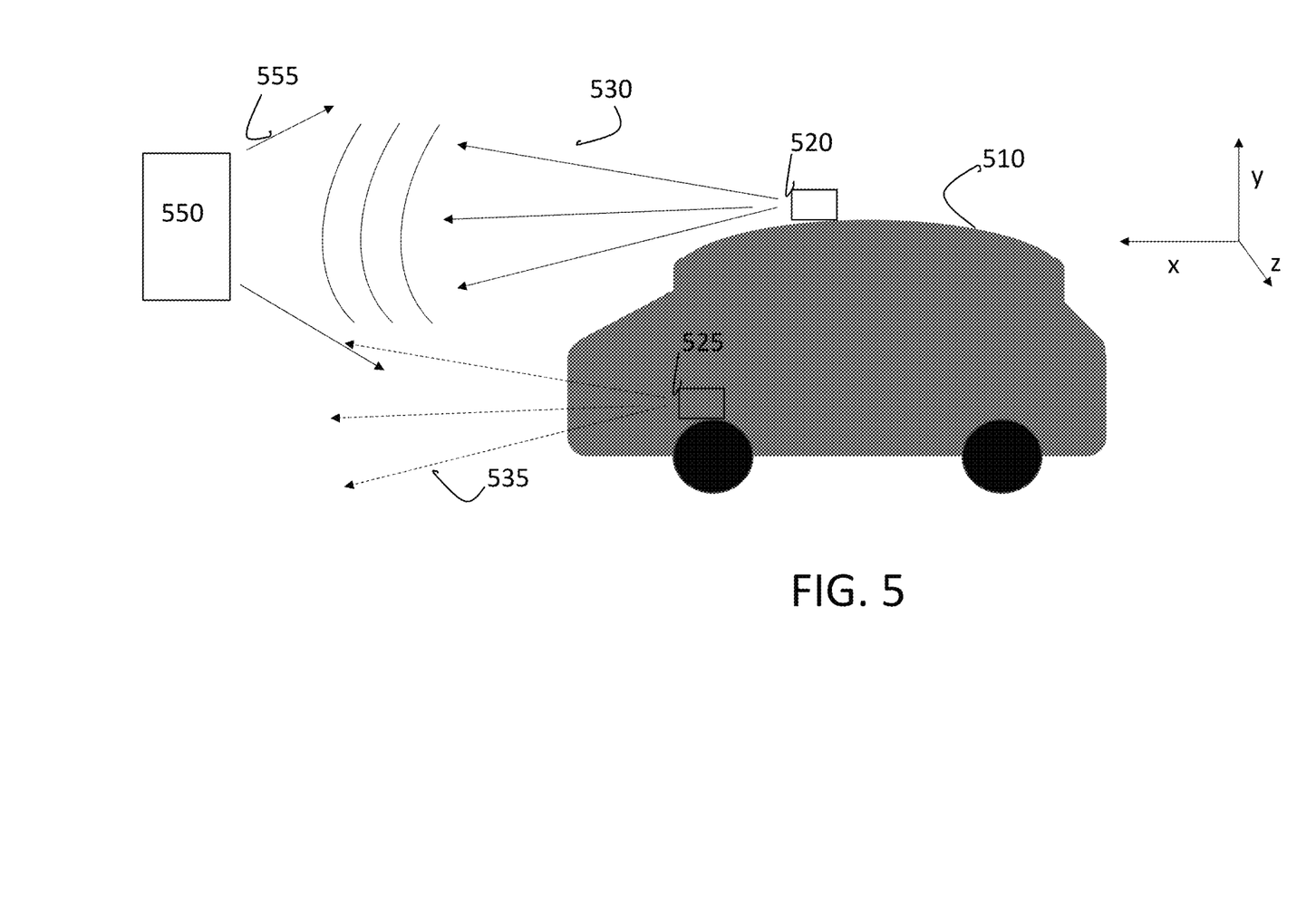
FIG. 5 is a schematic diagram of illustrating a vehicle employing a scanning system in accordance with an alternative embodiment of the invention.

FIG. 5 is a diagram illustrating vehicle 510 employing a scanning system 520 in accordance with an alternative embodiment of the invention. Similar to the system described in connection with FIG. 1, a vehicle 510, such as a car, may contain one or more scanning systems 520. The scanning system 520 may include an energy source (not shown in FIG. 5), such as a light source for a lidar system, or a radio signaling source in a radar system. In yet other embodiments, the scanning system may be a millimeter wave radar system and the energy source may be a millimeter wave. Additionally, the scanning system 520 further includes at least one undampened inertial measurement unit 535 below a suspension of a chassis of the vehicle. In some embodiments, the undampened inertial measurement unit 535 may be located in the wheel. In some scanning systems consistent with principles of the invention, there may be multiple undampened inertial measurement units, each providing more localized information relating to the chassis displacement.

As the vehicle 510 moves, the scanning system 520 may transmit an energy signal 530 through a transmittal area to detect any objects 550 within the area. The scanning system 520 also includes a detector (not shown in FIG. 5) to receive a return energy signal 555. Using the returning energy signal 555, the approximate range and position of the object 550 may be calculated based on differences in return times and phase data.

As the vehicle 510 travels along one direction (e.g. along the x-axis) and transmits energy signals 530, movements in other directions (e.g. the x-axis, y-axis and z-axis) may displace the position of the scanning system's sensor to affect the expected location or timing of the return signal 555 leading to image stabilization issues. To compensate for any vibration due to the motion and to uneven road conditions, the scanning system 520 may use an inertial measurement unit (not shown in FIG. 5) in proximity to the energy source to measure spatial or angular displacement of the detector relative to the energy source. The calculated range and position of the object may then be adjusted based on the spatial or angular displacement of the detector, and a representation of the target, such as a three-dimensional digital representation of the target implemented in one or more electronic media, can be made. Furthermore, the undampened inertial measurement unit may provide data measuring an undampened spatial or angular displacement of the detector relative to the ground. The undampened spatial or angular displacement of the detector relative to the ground may be used to provide full dynamics of a vehicle's movement, both in the chassis and along the road.

In some embodiments, the undampened inertial measurement unit may capture the effects of multiple road and environmental events, and in some embodiments be used with various tire/wheel and other sensors to detect air, fog, or gas etc. Further, a processor in the system may be further configured to transmit signals to an actuator to control the positioning of the energy source based on the spatial or angular displacement of the detector and the undampened spatial or angular displacement of the detector relative to the ground. Additionally, where a vehicle employs an active suspension, the undampened data may be used to control vertical movement of the vehicle's wheels relative to the chassis based on the spatial or angular displacement of the detector and the undampened spatial or angular displacement of the detector relative to the ground.

The teachings of all patents, published applications and references cited herein are incorporated by reference in their entirety.

In accordance with an embodiment of the invention, a "Lidar" system is one that measures distances to a target by illuminating the target with light and measuring the returning light from the target with a sensor. The light may be pulsed or coherent. Based on the returning signal, for example based on differences in laser return times and wavelengths, a representation of the target, such as a three-dimensional digital representation of the target implemented in one or more electronic media, can be made.

In accordance with an embodiment of the invention, a light transmitter source can include a laser source, such as a laser diode. For example, laser diodes made on a Gallium Arsenide (GaAs) substrate, which can meet Class I eye safety requirements, can be used, although it will be appreciated that a variety of different possible laser diodes and other light transmitter sources can be used.

In accordance with an embodiment of the invention, a light detector can be any suitable light detector for the light source, optical system and field of use. In one embodiment, a silicon-based photodetector, or any other type of photodetector, including an Avalanche Photo Detector (APD), can be used.

While example embodiments have been particularly shown and described, it will be understood by those skilled in the art that various changes in form and details may be made therein without departing from the scope of the embodiments encompassed by the appended claims.

What is claimed is:

1. A self-calibrating scanning system comprising:
    an energy transmission source configured to transmit transmittal energy signal through a transmittal area;
    a detector configured to receive a return energy signal of at least one target object of the energy transmission source within the transmittal area;
    a first inertial measurement unit (IMU) in proximity to the energy transmission source, the first IMU configured to measure a first displacement of the detector relative to the energy transmission source;
    a second IMU configured to measure a second displacement of the detector relative to ground; and
    a processor configured to execute a set of instructions to:
        calculate initial position data of the at least one target object from information relating to at least one of a time and phase of the return energy signal relative to the transmittal energy signal;
        calculate adjusted position data of the at least one target object by adjusting the initial position data based on the first displacement of the detector and the second displacement of the detector; and
        generate a map of the transmittal area, the map including a location of the at least one target object based on the adjusted position data.

2. The self-calibrating scanning system of claim 1, further comprising a wheel sensor configured to obtain undampened road condition data, wherein the adjusted position data is further based on the undampened road condition data.

3. The self-calibrating scanning system of claim 1, further comprising a controller communicatively coupled to the processor and configured to transmit signals to an actuator to control positioning of the energy transmission source based on at least one of the first displacement of the detector and the second displacement of the detector.

4. The self-calibrating scanning system of claim 1, wherein the second IMU is configured to mount to an active suspension, and
    the self-calibrating scanning system further comprises a controller configured to transmit signals to control vertical movement of one or more wheels of a vehicle relative to a chassis based on at least one of the first displacement of the detector and the second displacement of the detector.

5. The self-calibrating scanning system of claim 1, wherein the first displacement is a spatial displacement or an angular displacement.

6. The self-calibrating scanning system of claim 1, wherein the second displacement is a spatial displacement or an angular displacement.

7. The self-calibrating scanning system of claim 1, wherein the second displacement is an undampened displacement.

8. The self-calibrating scanning system of claim 1, wherein the initial position data comprises at least one of a range and position of the at least one target object.

9. The self-calibrating scanning system of claim 1, wherein the second IMU is configured to mount below a suspension of a chassis of a vehicle.

10. The self-calibrating scanning system of claim 1, wherein the self-calibrating scanning system comprises a light detection and ranging system, and wherein the energy transmission source is a light source.

11. The self-calibrating scanning system of claim 1, wherein the self-calibrating scanning system comprises a millimeter wave radar system, and wherein the energy transmission source is a millimeter wave source.

12. The self-calibrating scanning system of claim 1, wherein the transmittal energy signal is a radio signal, and wherein the detector is a radio signal detector configured to detect a return radio signal corresponding to the radio signal.

13. The self-calibrating scanning system of claim 1, further comprising:
    a radio signaling source configured to transmit an outgoing radio signal through the transmittal area; and
    a radio signal detector configured to detect a return radio signal corresponding to the outgoing radio signal.

14. The self-calibrating scanning system of claim 13, wherein the self-calibrating scanning system is configured to generate a probabilistic map of the transmittal area based on the return radio signal, and wherein the adjusted position data is further based on synchronizing the map of the transmittal area with the probabilistic map.

15. A method of calibrating a scanning system, the method comprising:
    transmitting, via an energy transmission source, a transmittal energy signal through a transmittal area;
    receiving, via a detector, a return energy signal corresponding to at least one target object within the transmittal area;
    measuring, via a first inertial measurement unit (IMU), a first displacement of the detector relative to the energy transmission source;
    measuring, via a second IMU, a second displacement of the detector relative to ground;
    calculating initial position data of the at least one target object from information relating to at least one of a time and phase of the return energy signal relative to the transmittal energy signal;
    calculating adjusted position data of the at least one target object by adjusting the initial position data based on the first displacement of the detector and the second displacement of the detector; and
    generating a map of the transmittal area, the map including a location of the at least one target object based on the adjusted position data.

16. The method of claim 15, wherein the first displacement is a spatial displacement or an angular displacement.

17. The method of claim 15, wherein the second displacement is a spatial displacement or an angular displacement.

18. The method of claim 15, wherein the second displacement is an undampened displacement.

19. The method of claim 15, wherein the initial position data comprises at least one of a range and position of the at least one target object.

20. The method of claim 15, wherein the second IMU is configured to mount below a suspension of a chassis of a vehicle.

21. The method of claim 15, wherein the scanning system comprises a light detection and ranging system, and wherein the energy transmission source is a light source.

* * * * *